US008463947B2

(12) United States Patent
Jenkins

(10) Patent No.: US 8,463,947 B2
(45) Date of Patent: Jun. 11, 2013

(54) METHOD OF FINDING RINGS FOR OPTIMAL ROUTING OF DIGITAL INFORMATION

(75) Inventor: David W. Jenkins, North Aurora, IL (US)

(73) Assignee: Tellabs Operations, Inc., Naperville, IL (US)

(*) Notice: Subject to any disclaimer, the term of this patent is extended or adjusted under 35 U.S.C. 154(b) by 483 days.

(21) Appl. No.: 12/013,785

(22) Filed: Jan. 14, 2008

(65) Prior Publication Data
US 2008/0175153 A1 Jul. 24, 2008

Related U.S. Application Data

(63) Continuation-in-part of application No. 10/230,004, filed on Aug. 28, 2002, now Pat. No. 7,346,709.

(51) Int. Cl.
*G06F 15/16* (2006.01)

(52) U.S. Cl.
USPC .......................................................... 709/251

(58) Field of Classification Search
USPC .............................. 709/238, 251, 200; 370/258
See application file for complete search history.

(56) References Cited

U.S. PATENT DOCUMENTS

| | | | |
|---|---|---|---|
| 5,412,652 A | 5/1995 | Lu | 370/223 |
| 5,515,367 A | 5/1996 | Cox, Jr. et al. | 370/60.1 |
| 5,535,038 A | 7/1996 | Hinch | 359/180 |
| 5,546,542 A * | 8/1996 | Cosares et al. | 709/241 |
| 5,563,877 A | 10/1996 | Van Tetering et al. | 370/58.2 |
| 5,564,021 A | 10/1996 | Qiu et al. | 370/460 |
| 5,657,142 A | 8/1997 | Fahim | 359/110 |
| 5,706,276 A | 1/1998 | Arslan et al. | 370/216 |
| 5,715,432 A | 2/1998 | Xu et al. | 395/500 |
| 5,717,693 A | 2/1998 | Baydar et al. | 370/514 |
| 5,729,692 A | 3/1998 | Qiu et al. | 395/200.71 |
| 5,742,605 A | 4/1998 | Norman, Jr. | 370/405 |
| 5,742,774 A | 4/1998 | Al-Salameh et al. | 395/200.81 |
| 5,784,557 A | 7/1998 | Oprescu | 709/220 |
| 5,793,225 A | 8/1998 | Gerson | 326/68 |
| 5,793,753 A | 8/1998 | Hershey et al. | 370/252 |
| 5,821,937 A | 10/1998 | Tonelli et al. | 345/356 |
| 5,831,610 A | 11/1998 | Tonelli et al. | 345/335 |
| 5,903,370 A | 5/1999 | Johnson | 359/119 |
| 5,923,646 A | 7/1999 | Mandhyan | 370/254 |
| 5,923,653 A | 7/1999 | Denton | 370/375 |
| 5,930,016 A | 7/1999 | Brorson et al. | 359/127 |
| 6,021,113 A | 2/2000 | Doshi et al. | 370/228 |
| 6,026,088 A | 2/2000 | Rostoker et al. | 370/395 |

(Continued)

OTHER PUBLICATIONS

U.S. Appl. No. 60/268,201, filed Feb. 12, 2001, Chow et al.

(Continued)

*Primary Examiner* — Ryan Jakovac
(74) *Attorney, Agent, or Firm* — Fitzpatrick, Cella, Harper & Scinto

(57) ABSTRACT

A method for planning a network having a plurality of nodes. The method may include determining all possible rings in the network satisfying a predetermined condition and calculating a utilization score for each possible ring based on a combination of predetermined selection criteria. The method may include selecting the possible ring with the highest utilization score and determining whether there are remaining nodes among the plurality of nodes that are not included in the selected possible ring. The method may further include selecting another possible ring if it is determined there are remaining nodes.

20 Claims, 11 Drawing Sheets

U.S. PATENT DOCUMENTS

| | | | | |
|---|---|---|---|---|
| 6,031,840 | A | 2/2000 | Christie et al. | 370/410 |
| 6,038,044 | A | 3/2000 | Fee et al. | 359/119 |
| 6,038,678 | A | 3/2000 | Fukushima et al. | 714/4 |
| 6,061,335 | A * | 5/2000 | De Vito et al. | 370/258 |
| 6,073,248 | A | 6/2000 | Doshi et al. | 714/4 |
| 6,081,525 | A | 6/2000 | Christie et al. | 370/392 |
| 6,092,117 | A | 7/2000 | Gladwin et al. | 709/239 |
| 6,094,417 | A | 7/2000 | Hansen et al. | 370/222 |
| 6,098,094 | A | 8/2000 | Barnhouse et al. | 709/203 |
| 6,101,012 | A | 8/2000 | Danagher et al. | 359/127 |
| 6,104,699 | A | 8/2000 | Holender et al. | 370/235 |
| 6,115,517 | A | 9/2000 | Shiragaki et al. | 385/24 |
| 6,115,825 | A | 9/2000 | Laforge et al. | 713/400 |
| 6,125,111 | A | 9/2000 | Snow et al. | 370/360 |
| 6,130,764 | A | 10/2000 | Taniguchi | 359/119 |
| 6,130,876 | A | 10/2000 | Chaudhuri et al. | 370/228 |
| 6,141,318 | A | 10/2000 | Miyao | 370/217 |
| 6,163,527 | A | 12/2000 | Ester et al. | 370/228 |
| 6,167,062 | A | 12/2000 | Hershey et al. | 370/503 |
| 6,178,025 | B1 | 1/2001 | Hardcastle et al. | 359/177 |
| 6,192,174 | B1 | 2/2001 | Lee | 385/24 |
| 6,223,074 | B1 | 4/2001 | Granger | 600/544 |
| 6,229,815 | B1 | 5/2001 | Huang et al. | 370/437 |
| 6,324,162 | B1 | 11/2001 | Chaudhuri | 370/225 |
| 6,330,245 | B1 | 12/2001 | Brewer et al. | 370/424 |
| 6,331,905 | B1 | 12/2001 | Ellinas et al. | 359/110 |
| 6,396,852 | B1 | 5/2002 | Simmons | 370/535 |
| 6,567,429 | B1 | 5/2003 | DeMartino | 370/539 |
| 6,654,379 | B1 | 11/2003 | Grover et al. | 370/406 |
| 6,728,205 | B1 | 4/2004 | Finn et al. | 370/217 |
| 6,819,662 | B1 | 11/2004 | Grover et al. | 370/351 |
| 6,826,158 | B2 | 11/2004 | Seaman et al. | 370/254 |
| 6,941,359 | B1 | 9/2005 | Beaudoin et al. | 709/221 |
| 7,133,410 | B2 | 11/2006 | Chow et al. | 370/404 |
| 2001/0012298 | A1 | 8/2001 | Harshavardhana et al. | 370/405 |
| 2002/0036988 | A1* | 3/2002 | Cardwell et al. | 370/238 |
| 2002/0118687 | A1 | 8/2002 | Chow et al. | |
| 2003/0167348 | A1 | 9/2003 | Greenblat | 709/251 |
| 2004/0057444 | A1 | 3/2004 | Brewer et al. | 370/403 |
| 2004/0162718 | A1 | 8/2004 | Watkins et al. | 703/21 |
| 2004/0208578 | A1 | 10/2004 | Kinoshita et al. | 398/83 |

OTHER PUBLICATIONS

U.S. Appl. No. 60/270,094, filed Feb. 20, 2001, Chow et al.

RSoft Research Software CAD Tools for Optoelectronics Demo CD, [printout of CD-ROM], Rsoft, Inc., LiLinkSIM™, 33 sheets (available by 2001).

VPI Virtual Photonics Seminar Folder Handout, bearing title"Speed up Photonics", © VPI 2001 (44 sheets).

Network Design House Seminar Folder Handout, bearing title"Netscene, better networks by design" (ten sheets) (available by 2001).

RSOST Reaseach Software Folder, bearing title "Building Blocks for Photonics CAD and Simulation Spanning the Range from Nanometers to Megameters" (24 sheets) (available by 2001).

MIL3 Modeling Technologies for the Third Millennium, bearing title "Modeler (Powered by OPNET Simulation Technology) The Network Simulation Power Tool", pp. 1-94 (available by 2001).

Modiano, E. et al., "Designing Survivable Networks using Effective Routing and Wavelength Assignment (RWA)," Optical Fiber Communication Conference, OSA Technical Digest (Optical Society of America, Washington DS, 2001) TuG, pp. TuG5-1 to TuG5-3 (available by 2001).

Scarmozzino, R. et al., "Numerical Techniques for Modeling Guided-Wave Photonic Devices", IEEE Journal of Selected Topics in Quantum Electronics, vol. 6, No. 1, Jan./Feb. 2000, pp. 150-162.

Netscene Product Suite Network Design Software Demo 2001, [printout of CD-ROM], © Network Design House 2001, 218 sheets (available by 2001).

Chan, K., et al., "Analysis of Least Congested Path Routing in WDM Lightwave Networks", INFOCOM 1994, Networking for Global Communications. 13$^{th}$ Proceedings IEEE. Jun. 12-16, 1994, pp. 962-969.

Gerstel, O., et al., "Upgrading Sonet Rings with WDM Instead of TDM: An Economic Analysis", OFC/IOOC 1999, Technical Digest, Feb. 21-26, 1999, pp. 75-77.

Ramaswami, R., et al, "Optical Networks: A Practical Perspective", Morgan Kaufmann Publishers, Inc., San Francisco, CA, 1998, pp. 329-335, 405 and 406.

Ahuja, R., et al., "Network Flows" Prentice-Hall, Inc., NJ, Sect 16.4, 1993, pp. 615-620, 627 and 628.

Biagi, S., "Rings, Routing and Revenues", Telephony, Oct. 5, 1998, pp. 45 and 48.

Daza, J., et al., "Blinded by the Wave-division Light," Network World, Jun. 15, 1998, (accessed Mar. 28, 2006), http://www.networkworld.com/news/tech/0615tech.html.

Flanagan, T., "Fiber Network Survivability", IEEE Communications Magazine, vol. 28, No. 6, Jun. 1990, pp. 46-53.

May, G., et al., "A Distributed Architecture for Survivable Sonet Transport Networks", Global Telecommunications Conference, 1991 (GLOBECOM '91), vol. 3, Dec. 2-5, 1991; pp. 2013-2017.

Mori, T., et al., "Ultra High-speed SONET Fiber-optic Transmission System", Hitachi Review, vol. 47, No. 2, 1998, pp. 79-84.

To, M., et al., "Planning and Deploying a SONET-based Metro Network", IEEE LTS, vol. 2, No. 4, Nov. 1991, pp. 19-23.

Wilk, T., "More Bang for Your Buck, DWDM no Longer too Costly for Hub Interconnects", CED Magazine, Feb. 1, 1998, (accessed Mar. 23, 2006), http://www1.cedmagazine.com/article/CA6261041.html.

Wuttisittikulkij, L., et al., "Design of a WDM Network Using a Multiple Ring Approach", IEEE Global Telecommunications Conference 1997, vol. 1, Nov. 3-8, 1997, pp. 551-555.

Synchronous Optical Network (SONET) Tutorial (selected portions), The International Engineering Consortium (selected portions), site was last updated on Dec. 4, 2004, www.iec.org/tutorials/sonet.

Fiber-optic Technology Tutorial (selected portions), The International Engineering Consortium (selected portions), site was last updated on Dec. 28, 2005, www.iec.org/tutorials/fiber$_{13}$ optic/index.html.

Dense Wavelength Division Multiplexing (DWDM) Performance and Conformance Testing (selected portions), The International Engineering Consortium, site was last updated on Apr. 5, 2003, www.iec.org/tutorials/dwdm_perf/index.html.

Bollobás, B., "Modern Graph Theory", Springer-Verlag, NY, 1998, pp. 1-7, 72 and 73.

Papadimitriou, C. et al., "Combination Optimization: Algorithms and Complexity", Dover Publications, Inc., NY, 1998, pp. 20-23.

Myung, Y., et al., "Optimal Load Balancing on SONET Bidirectional Rings", Operations Research, vol. 45, No. 1, Jan.-Feb. 1997, pp. 148-152.

Suurballe, J. W., et al., "A Quick Method for Finding Shortest Pairs of Disjoint Paths", John Wiley & Sons, Inc., Networks, vol. 14 (1984), pp. 325-336.

Cormen, T., et al., "Introduction to Algorithms", Mass. Institute of Technology (1990), McGraw-Hill Companies, Inc., pp. 527-530.

Balakrishnan, V.K., "Schaum's Outline of Theory and Problems of Graph Theory", McGraw-Hill Companies, Inc. (1997), pp. 1-5 and 28-32.

Doshi, B., et al., "Broadband Network Infrastructure of the Future: Roles of Network Design Tools in Technology Deployment Strategies", IEEE Communications Magazine, May 1998, vol. 36, No. 5, pp. 60-71.

Grover W.D., et al., "Optimized Design of Ring-based Survivable Networks", Can. J. Elect. & Comp. Eng., vol. 20, No. 3 (1995), pp. 139-149.

Luss, H., et al., "Topological Network Design for SONET Ring Architecture", IEEE Transactions on Systems, Man, and Cybernetics, vol. 28, No. 6, Nov. 1998, pp. 780-790.

Zhang, X., et al., "An Effective and Comprehensive Approach for Traffic Grooming and Wavelength Assignment in SONET/WDM Rings", IEEE/ACM Transactions on Networking, vol. 8, No. 5, Oct. 2000, pp. 608-617.

Cosares et al., "SONET Toolkit: A Design Support System for Designing Robust and Cost Effective Fiber-Optic Networks", Interfaces, Jan.-Feb. 1995 (pp. 22-40), vol. 25, Issue 1, Institute for Operations Research and the Management Sciences.

Hanan Luss, Topological Network Design for Sonet Ring Architecture, IEEE Transactions on System, Man & Cybernetics—Part A: Systems & Humans, 1998, pp. 780-790, vol. 28, No. 6.

* cited by examiner

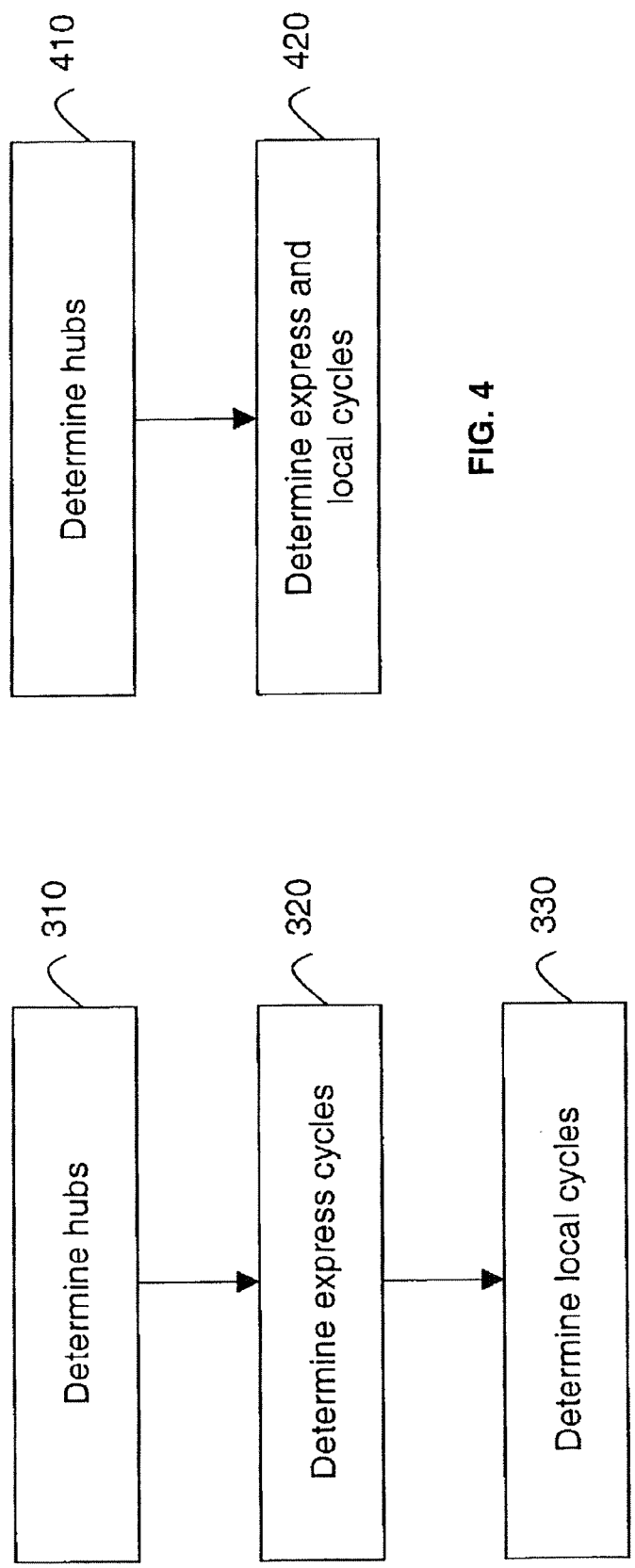

METHOD OF FINDING RINGS FOR OPTIMAL ROUTING OF DIGITAL INFORMATION

CROSS-REFERENCE TO RELATED APPLICATION

This application is a continuation-in-part of U.S. application Ser. No. 10/230,004, filed Aug. 28, 2002, which is herein incorporated by reference.

BACKGROUND

1. Field

Example aspects of the present invention generally relate to the management of rings in a network and, more particularly, to methods and apparatus to assign rings based on certain conditions.

2. Description of the Related Art

In a communication network having a plurality of interconnected nodes, there may be multiple routes that data can traverse from a source node to a target node (i.e., a node where the data will be used). In the design of these telecommunication networks, traffic is often required to be routed simultaneously along diverse paths in order to maintain a connection if a path between two nodes is cut. In most instances, these diverse paths form rings that interconnect nodes at many locations on the rings. When the network is planned, the rings can be set up to cost-effectively deliver service. The assignment of these rings may be critical and is often not addressed in network modeling tools.

Much effort has been made to efficiently assign equipment to rings once the rings are established. However, cost savings may be achieved by efficiently assigning rings in the network. The cost savings in choosing desirable ring structures may far outweigh benefits of efficiently packing sub-optimal ring structures.

SUMMARY OF THE INVENTION

According to one example aspect of the present invention, a method is provided to plan a network having a plurality of nodes. The method may include determining all possible rings in the network satisfying a predetermined condition. The method may also include calculating a utilization score for each possible ring based on a combination of predetermined selection criteria. The method may further include selecting the possible ring with the highest utilization score and determining whether there are remaining nodes among the plurality of nodes that are not included in the selected possible ring, and selecting another possible ring if it is determined there are remaining nodes.

According to another example aspect of the present invention, a computer-readable storage medium embodying program code for a network planning tool is provided. The computer-readable medium may include program code for determining all possible rings in the network satisfying a predetermined condition and for calculating a utilization score for each possible ring based on a combination of predetermined selection criteria. The computer-readable medium may also include program code for selecting the possible ring with the highest utilization score and for determining whether there are remaining nodes among the plurality of nodes that are not included in the selected possible ring. The computer-readable medium may further include program code for selecting another possible ring if it is determined there are remaining nodes.

According to still another example aspect of the present invention, an apparatus adapted to plan a network having a plurality of nodes is provided. The apparatus may include at least one memory device to store information about the nodes. The apparatus may further include a processor adapted to: determine all possible rings in the network satisfying a predetermined condition, calculate a utilization score for each possible ring based on a combination of predetermined selection criteria, select the possible ring with the highest utilization score, determine whether there are remaining nodes among the plurality of nodes that are not included in the selected possible ring, and select another possible ring if it is determined there are remaining nodes.

According to yet another example aspect of the present invention, a method is provided to plan a network having a plurality of nodes. The method may include determining all possible rings in the network satisfying a predetermined condition. The method may also include selecting a possible ring based on predetermined selection criteria and determining whether there are remaining nodes among the plurality of nodes that are not included in the selected possible ring, and selecting another possible ring if it is determined there are remaining nodes.

These and other aspects of the present invention will be described in further detail below, with reference to the accompanying drawings.

BRIEF DESCRIPTION OF THE DRAWINGS

The present invention is illustrated by way of example and not by way of limitation in the figures of the accompanying drawings, in which like references indicate similar elements and wherein:

FIG. 3 illustrates a flow diagram for assigning rings, according to an example embodiment of the present invention;

FIG. 4 illustrates a flow diagram for assigning rings, according to an example embodiment of the present invention;

DETAILED DESCRIPTION

An example embodiment for planning a network having a plurality of nodes will be described with respect to FIG. 1. In a ring network, each node is linked to two other nodes, so traffic received on one link is always sent out on the other link, and vice versa. Diverse routing is achieved within each ring by routing the unidirectional traffic in opposite directions along the ring. This example embodiment will be described in the context of a network in which routes are provisioned as rings containing the source node and the destination node. However, those skilled in the art will appreciate that this is merely one example embodiment of the present invention.

Figure 1:
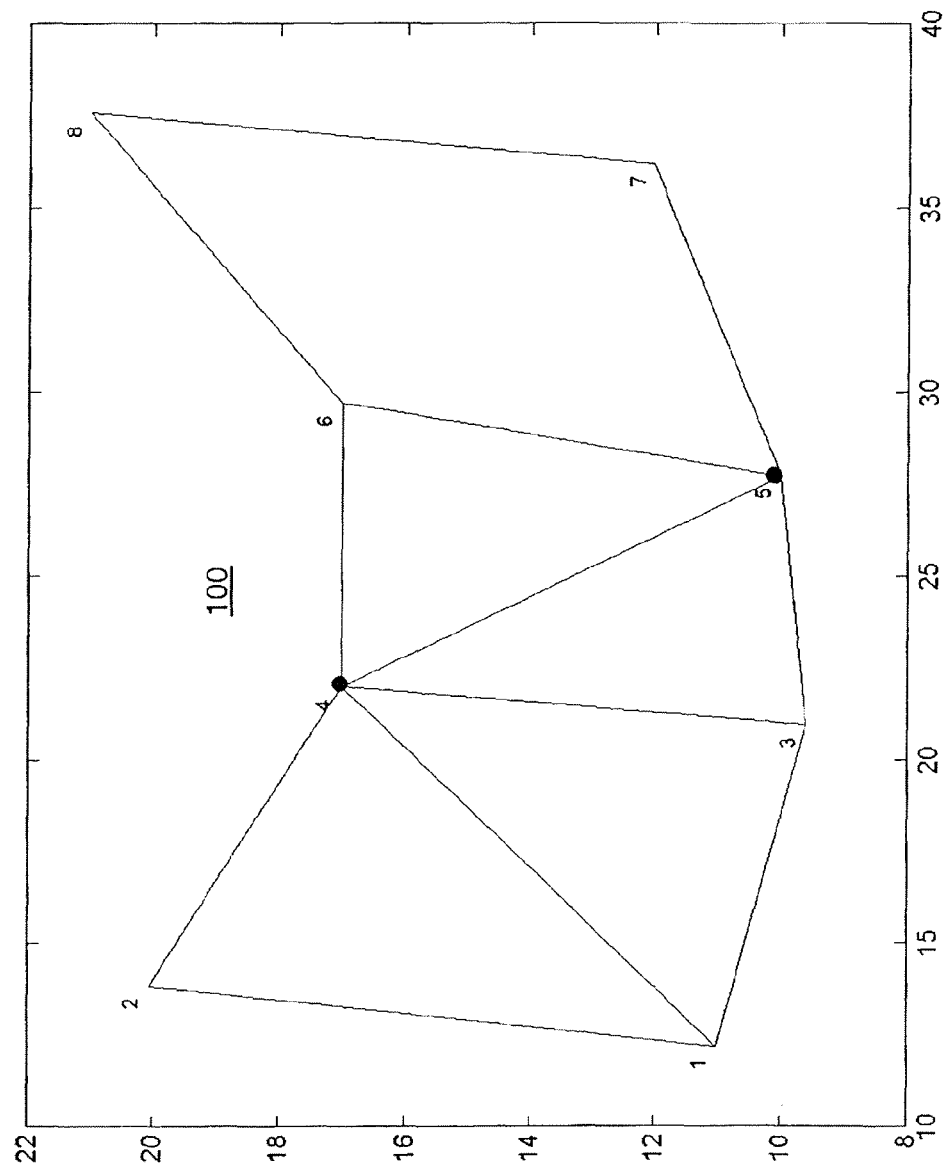
FIG. 1 illustrates an example fiber map of a network.

FIG. 1 illustrates an example fiber map of a network 100 that a service provider could supply to a network planner. In FIG. 1, nodes are at 1, 2, 3, 4, 5, 6, 7, and 8 and links are at 12, 24, 14, 13, 35, 43, 45, 57, 46, 65, 68, and 87. In this example embodiment of the present invention, central offices are placed at each of the nodes and fiber optic cables are placed at each of the links. A service provider could also supply preferences or requirements such as for example: traffic demands for each link, length of a link (i.e., in miles), equipment on each link (i.e., cost of components); and a preferred maximum number of nodes per ring (which for discussion purposes is referred to as n). With this information, a network planner may determine how to cost-effectively assign rings, hubs, and other network equipment.

FIG. 1 illustrates options for assigning rings. For example, if a service provider specifies a preferred maximum number of nodes per ring (i.e., n=3), the rings that fit this preference are at: 124, 143, 345, and 456. Another possible ring is located at 5678, even though it has four nodes, one node over the preferred maximum number of nodes per ring, n. Even though a service provider has a preferred maximum nodes per ring n, a service provider may be forced to accept an assignment of a ring having more than n nodes when the layout of the network does not permit a particular ring to have at most n nodes.

Another option for assigning rings is to assign an express ring. An express ring is a ring that has the preferred maximum nodes per ring n and connects local rings together by connecting hubs. It may be desirable to assign a ring that connects hubs because equipment such as cross-connect equipment, which typically resides at a hub, may have interoperability problems with other equipment on a ring. Accordingly, an express ring could be assigned to connect hubs on the same ring. Examples of assigning express rings can be found in network 100. As also shown in FIG. 1, hubs are located at nodes 4 and 5. Accordingly, a network provider may assign an express ring at, for example, rings 345, 456 or 1453.

In assigning express rings, the distances between hubs on a ring and the number of hubs on a ring may be considered. For example, an express ring with large distances between hubs reduces the number of hubs connected. This may also result in reducing the amount of cross-connect equipment used on the ring, thus reducing the cost of network components. On the other hand, an express ring with short distances between hubs and thus more cross-connect equipment to support a failure on the ring may provide better protection than a ring with long distances between hubs. To balance these competing objectives, an express ring could be assigned such that a user or a planning system allocates relative weight to selection criteria.

Figure 2:
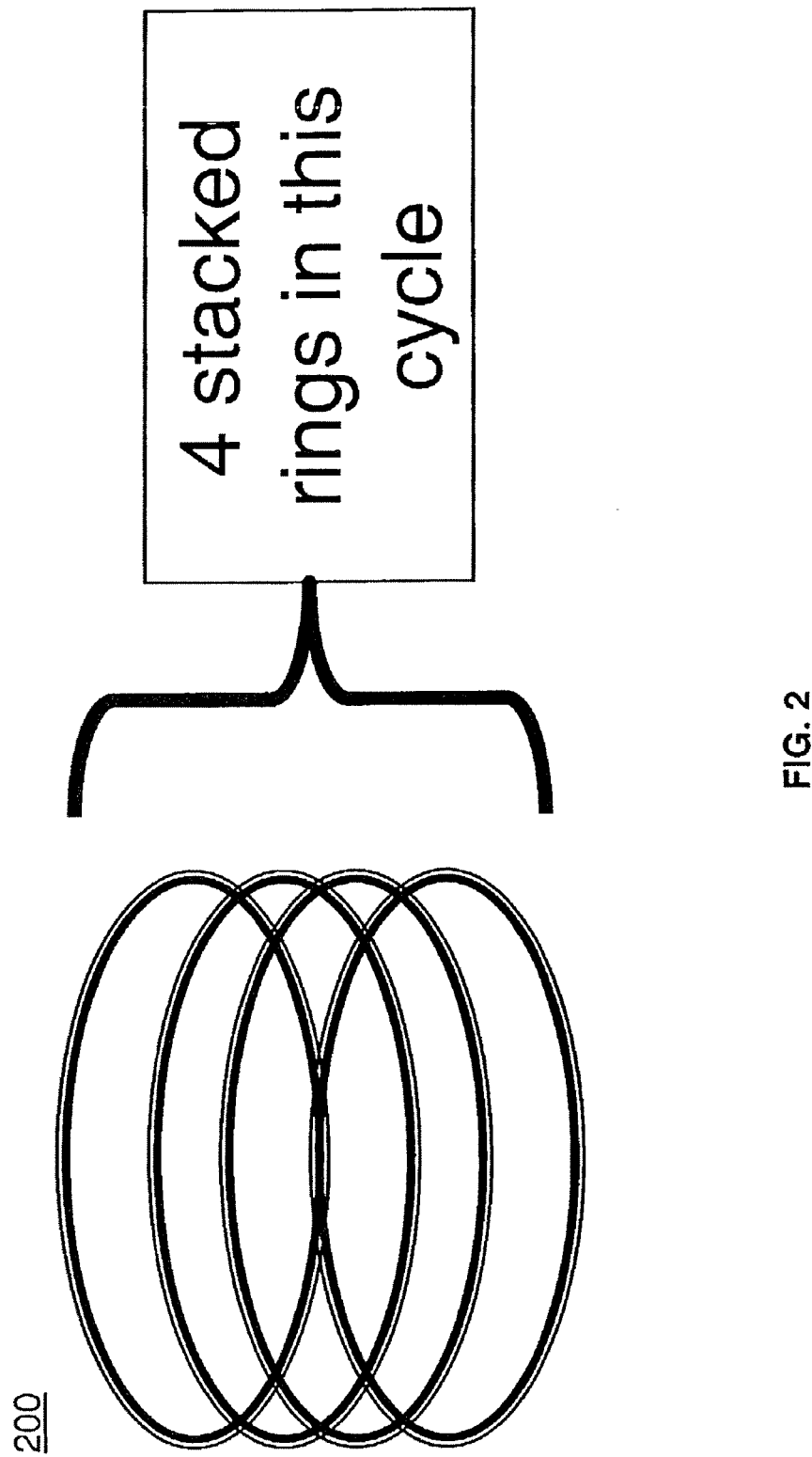
FIG. 2 illustrates a set of rings stacked to make a cycle, according to an example embodiment of the present invention.

FIG. 2 illustrates further options for assigning rings. In FIG. 2, rings 200 are stacked to make a cycle or a loop. A cycle or a loop is a stack of more than one ring. After a network provider has assigned rings to a network, any later traffic demand must be accommodated. For example, in FIG. 2, one ring could have a bandwidth of OC48 (2.5 Gb/s per stream). However a later traffic demand could require four times that bandwidth. To accommodate this additional traffic demand, equipment having bandwidth to support the additional traffic demand may be added to the ring. For example, three rings could be stacked on top of the existing ring. While the present invention can be implemented with rings and/or cycles, the term rings is referred to throughout.

Figure 7:
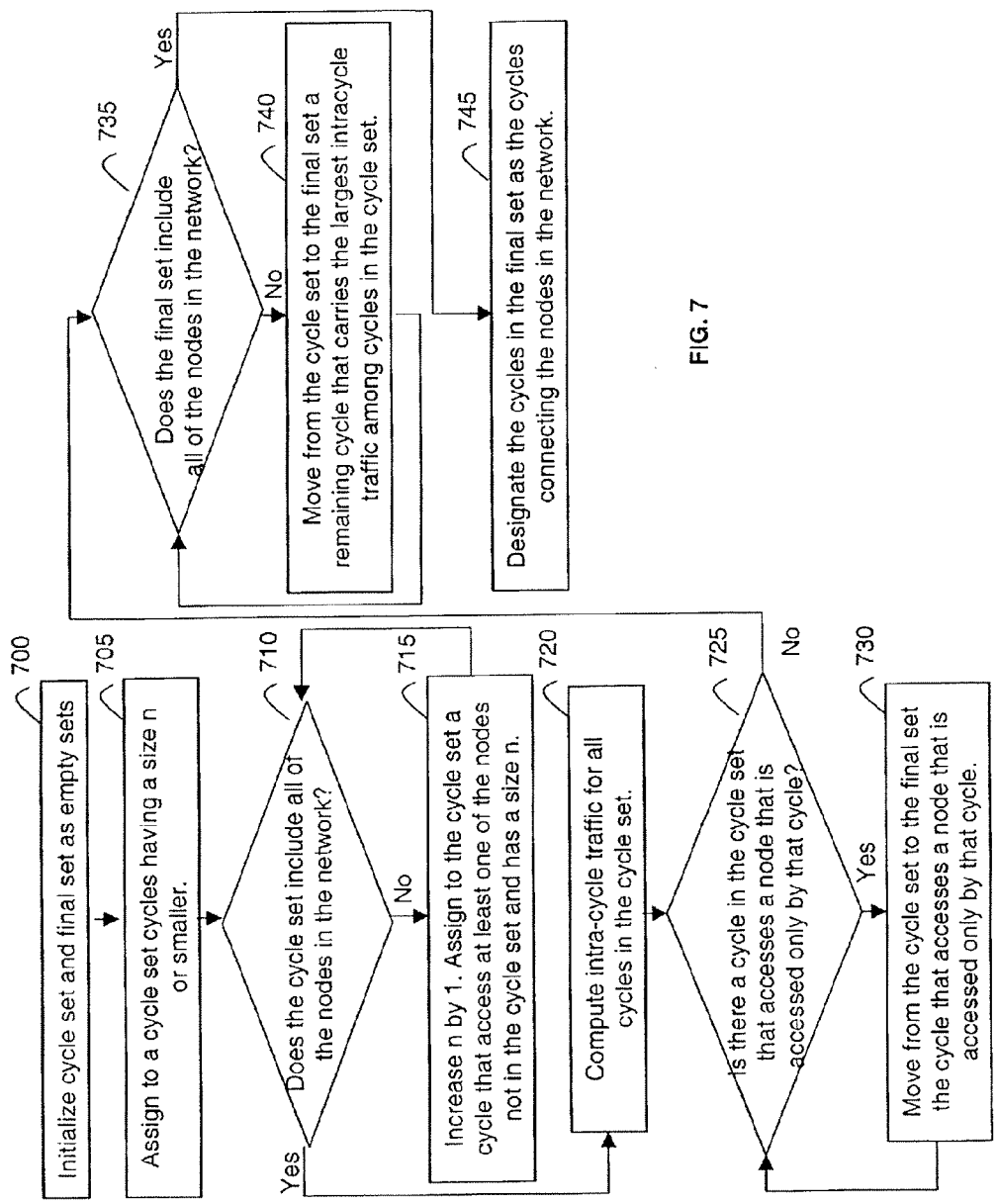
FIG. 7 illustrates a flow diagram describing a method for determining local rings, according to an example embodiment of the present invention.
Figure 10:
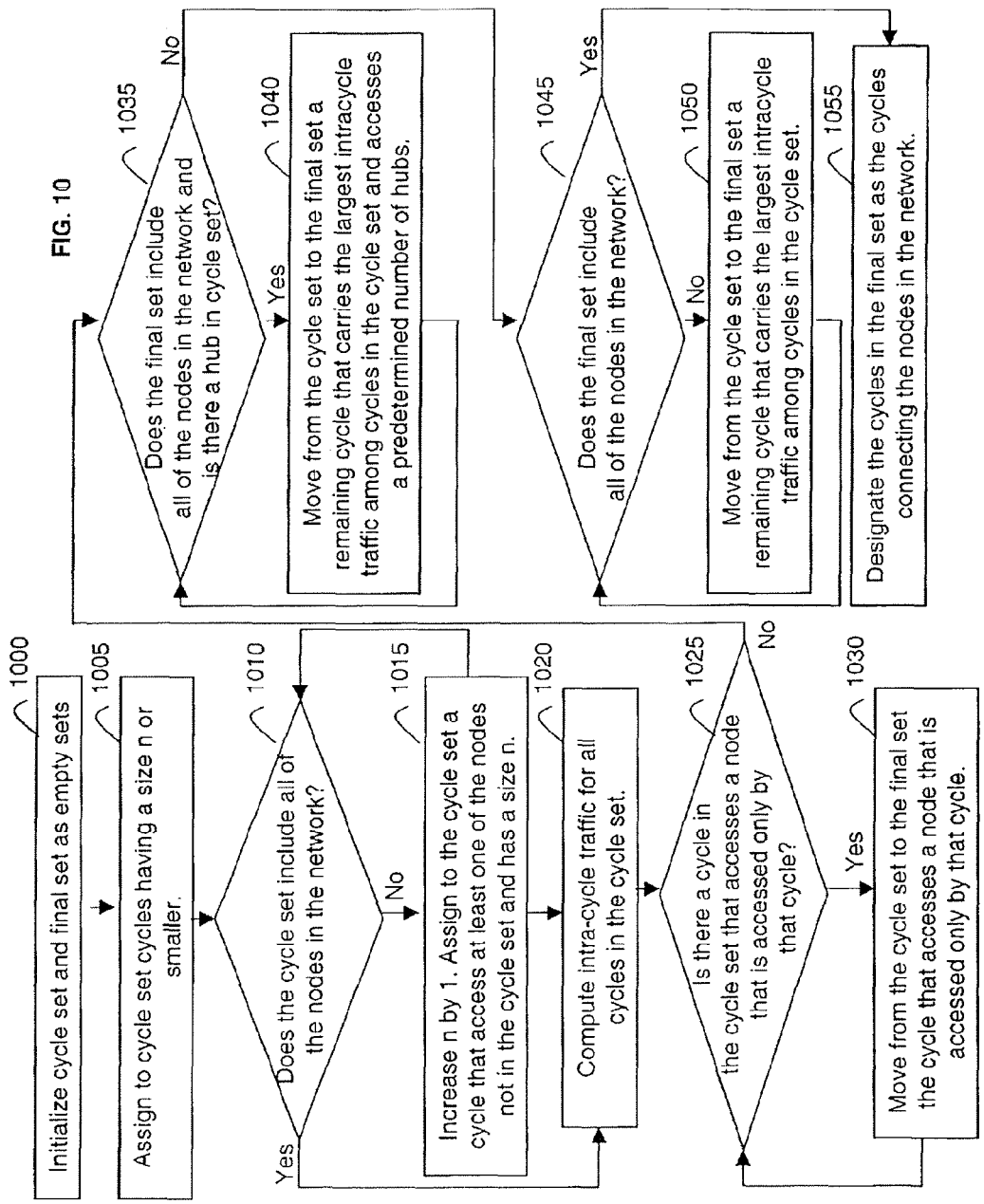
FIG. 10 illustrates a flow diagram illustrating a method for determining express and local rings, according to an example embodiment of the present invention.

The flow diagrams in FIGS. 3, 4, 7, and 10 illustrate a method for assigning rings for an example embodiment of the present invention. FIGS. 3 and 4 break down the example embodiment into blocks 310-330, and 410-420, respectively. FIG. 7 illustrates a method of performing block 330 (shown in FIG. 3) according to an example embodiment of the present invention, and FIG. 10 illustrates a method of performing block 420 (shown in FIG. 4) according to an example embodiment of the present invention. Some of the blocks illustrated in the flow diagrams may be performed in an order other than that which is described. Also, it should be appreciated that not all of the blocks described in the flow diagrams are required to be performed, that additional blocks may be added, and that some of the illustrated blocks may be substituted with other blocks.

FIG. 3 illustrates an example embodiment of a method to assign rings. At block 310, hubs are determined. Hub determination may be based on, for example, the amount of terminated traffic at a node, topology (for example, proximity of a hub to another hub), both the amount of terminated traffic at a node and topology, or other combination of criteria such as a service provider's requirements. At block 320, express rings, (i.e., rings that include a hub), are determined. At block 330, local rings, rings that do not include a hub, are determined.

FIG. 4 illustrates another example embodiment of a method to assign rings. At block 410, hubs are determined. At block 420, express and local rings are determined in the same block.

Figure 5:
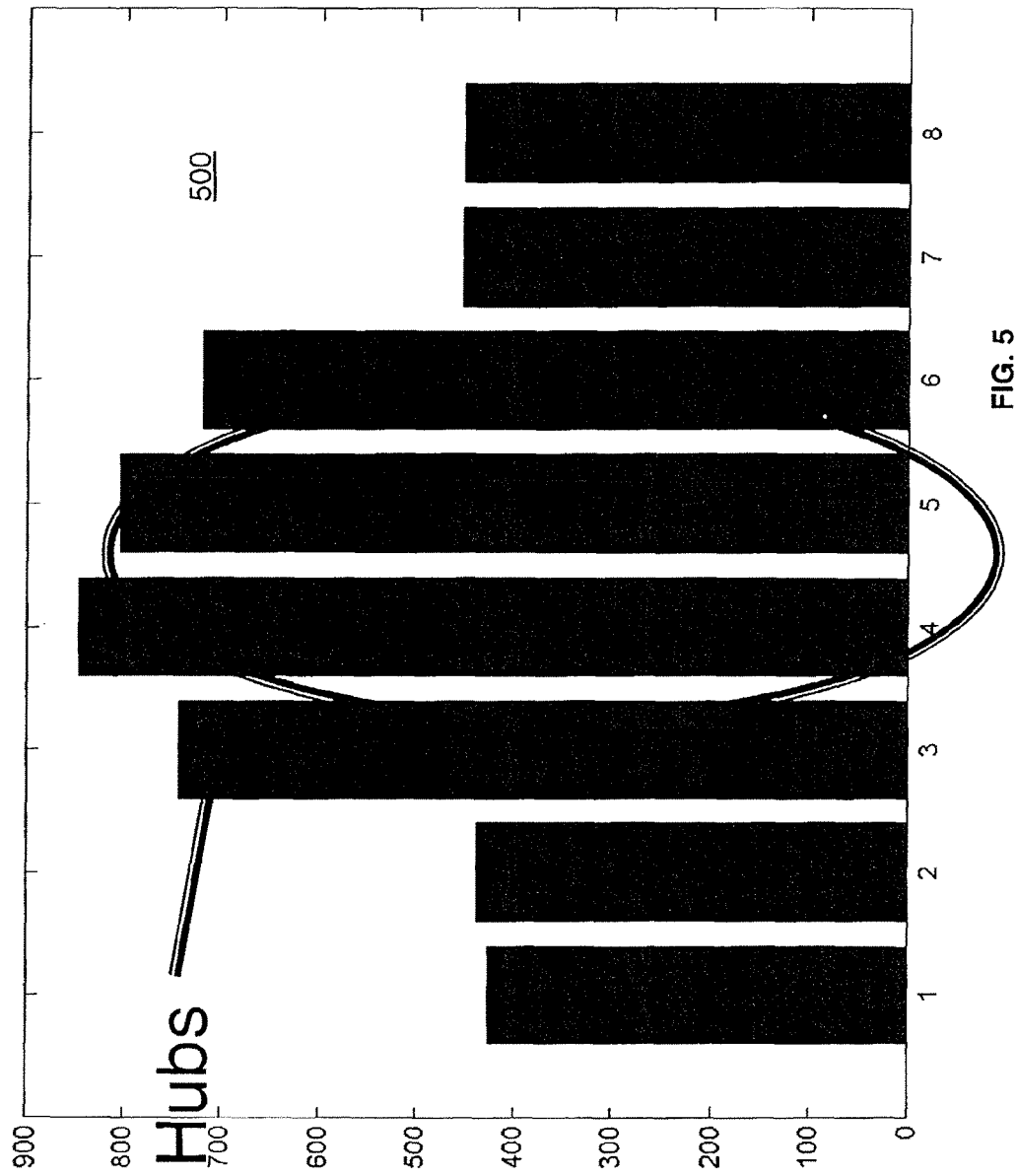
FIG. 5 illustrates a graph for determining hubs, according to an example embodiment of the present invention.

FIG. 5 illustrates determining hubs (block 310 in FIG. 3 and block 410 in FIG. 4) according to an example embodiment. In this example embodiment, hub selection is based on largest terminated traffic. FIG. 5 shows a graph 500 of terminated traffic for the nodes (1, 2, 3, 4, 5, 6, 7, and 8) in network 100 (shown in FIG. 1). As shown in graph 500, nodes 4 and 5 carry the largest amount of traffic of all of the nodes in the network. Accordingly, a network planner may decide to place hubs at nodes 4 and 5.

However, it is often the case that a network planner or service provider needs to consider factors other than simply the traffic demands in a particular node or within a given ring. For example, certain links may be underutilized if routes are provisioned using the optimizing algorithms or may be prone to failure due to the type of equipment or quality of the installation. Therefore, a network planner may consider other criteria, referred to herein as selection criteria. The selection criteria may relate to, for example, cost of ring components and ring circumference (i.e., the perimeter of the ring, measured for example in miles). A network planner may allocate a weight factor to each of the selection criteria. The selection criteria may further include the amount of traffic in a particular node or ring, although a network planner may consider a combination of other criteria, exclusive of the traffic demands in a node or within a ring. For example, a network planner may assign to each ring, manually or automatically, a weight factor for each selection criteria. The weight factor may constitute a numerical representation of the criticality of the respective factor according to the network planner's assessment. A utilization score can be calculated by multiplying each weight factor by the magnitude of the respective selection criteria and then summing the weighted values for all the selection criteria. Of course, the weights could be selected to be equal for all criteria. The network planner may then assign the network rings sequentially, starting with the ring having the highest utilization score, until all the traffic demands are satisfied.

Figure 6:
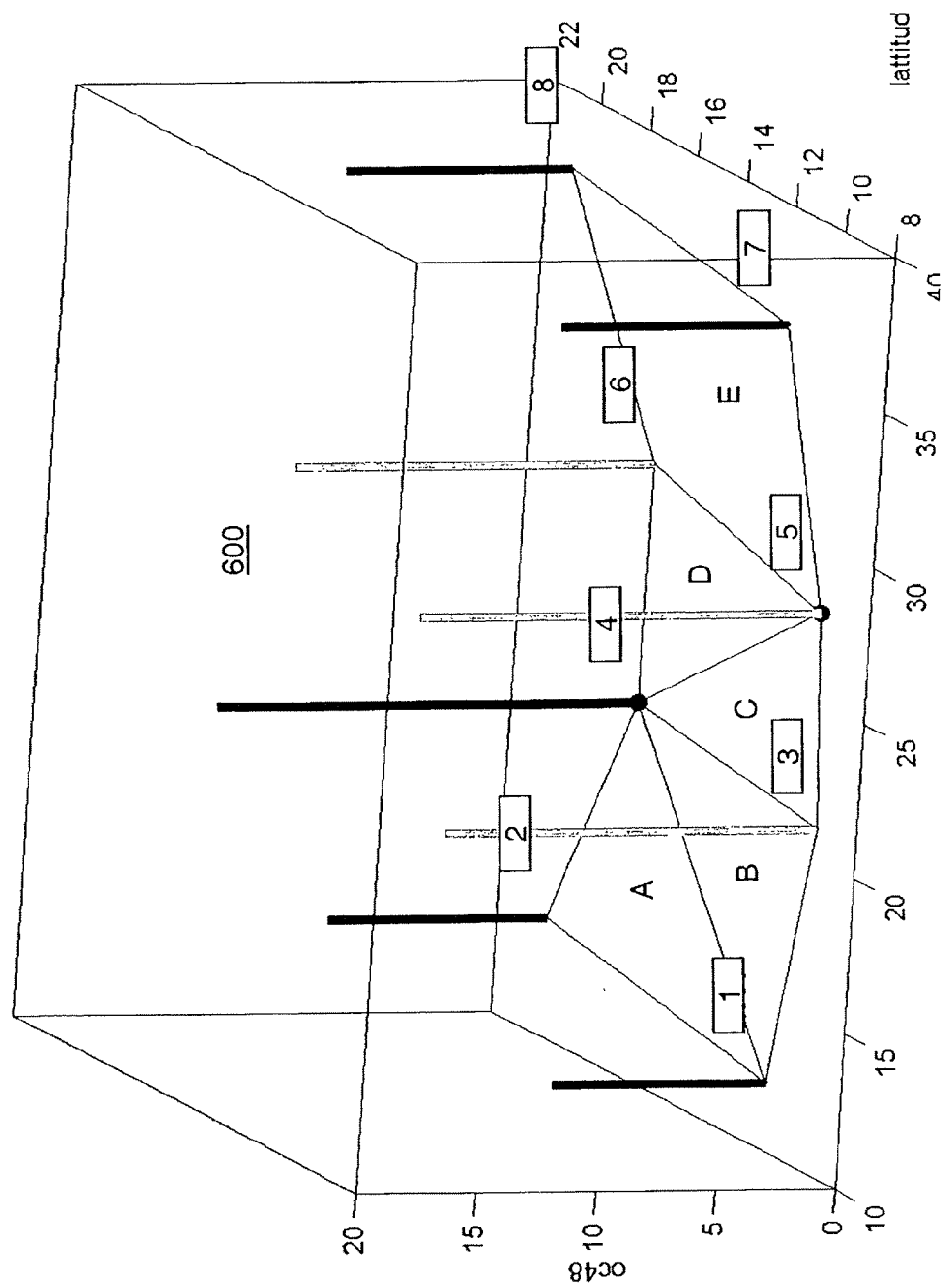
FIG. 6 illustrates a graph describing a method for determining hubs, according to an example embodiment of the present invention.

FIG. 6 also illustrates determining hubs (block 310 in FIG. 3 and block 410 in FIG. 4) according to an example embodiment. FIG. 6 shows network 100 (shown in FIG. 1) with an added dimension of terminated traffic. Because nodes 4 and 5 carry the largest terminated traffic of all of the nodes in the network, a network planner may decide to place hubs at these nodes. Graph 600 (shown in FIG. 6) also demonstrates how to determine express rings (block 320 in FIG. 3). In an example embodiment, hubs have been selected at nodes 4 and 5. Accordingly, a network provider may place an express ring at ring 345 or ring 456. However, as discussed above, a network planner may consider other selection criteria, such as cost of ring components and ring circumference and allocate a weight factor accordingly. The dimension of the graph for each node, as illustrated in FIG. 6, may be altered accordingly in order to depict a utilization score for each node or ring, representing the relative weight assigned by the network planner.

Figure 8:
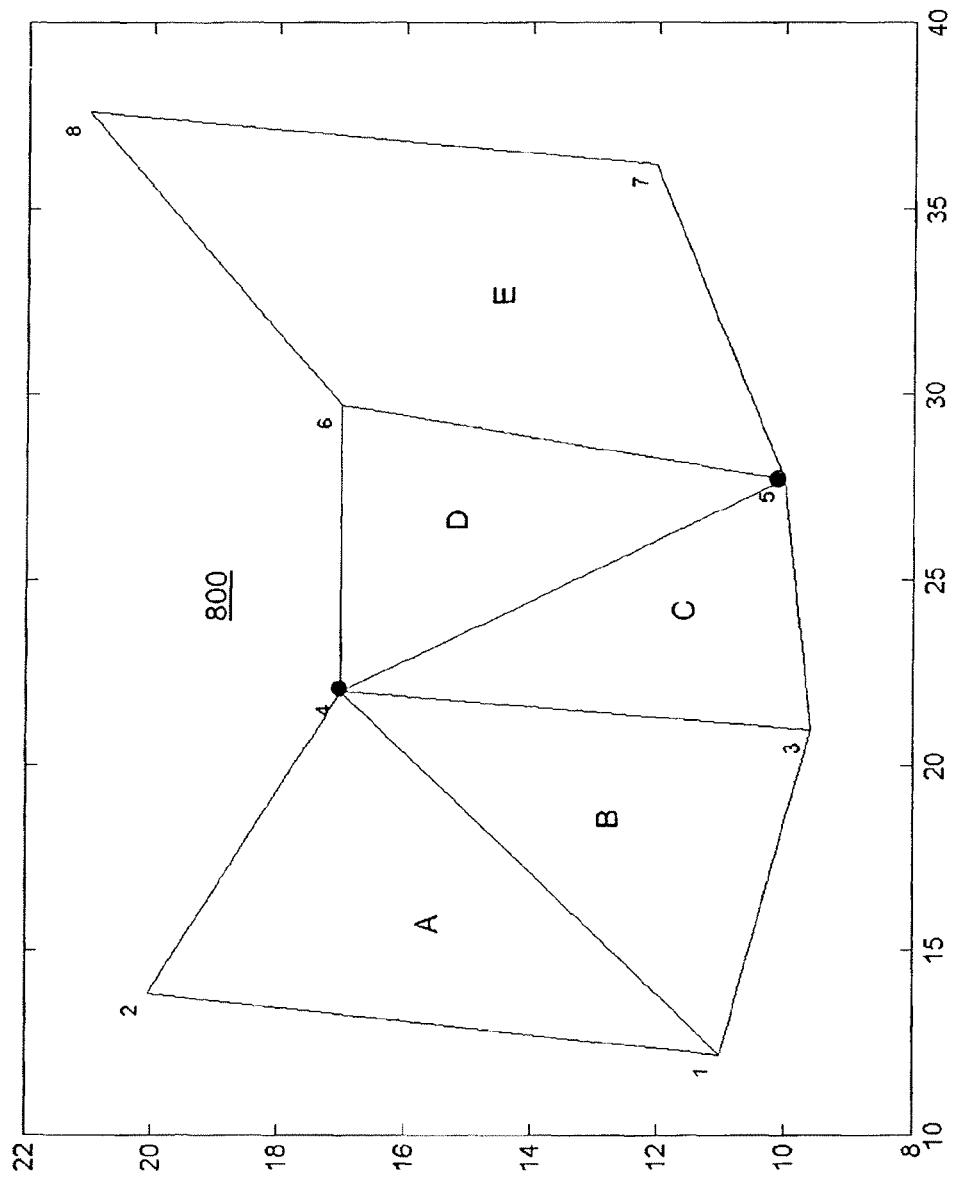
FIG. 8 illustrates an example fiber map of a network.
Figure 9:
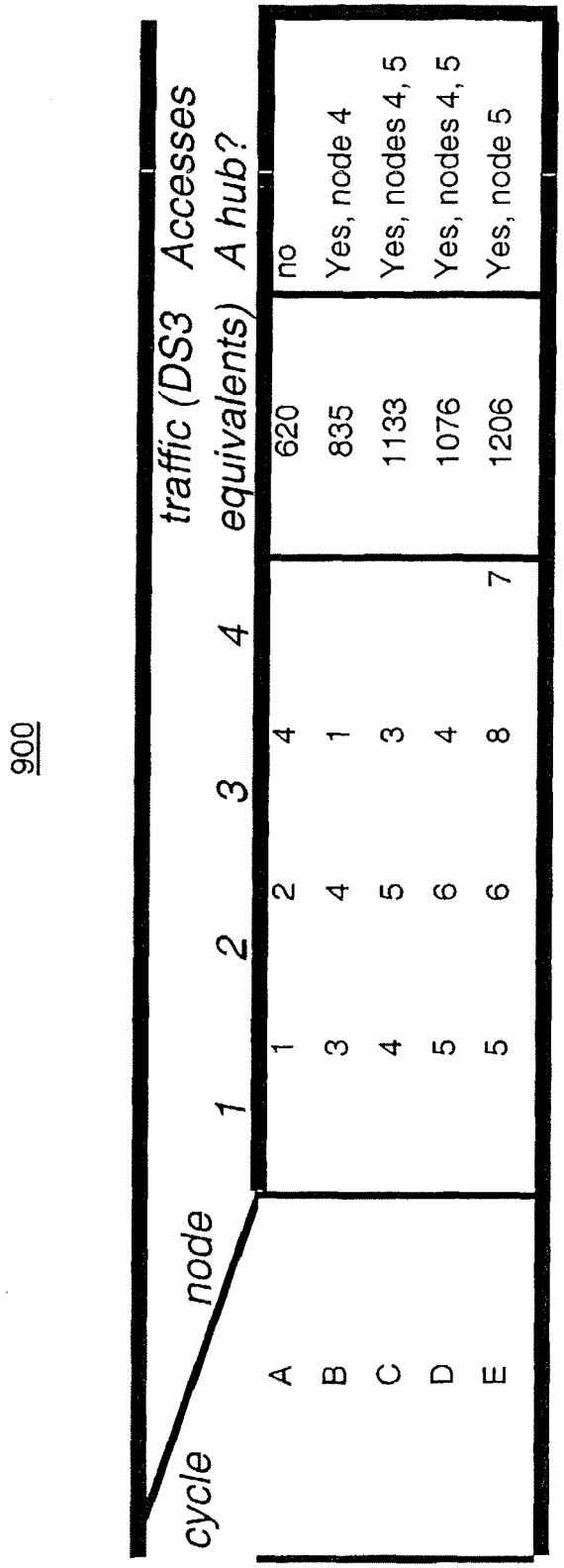
FIG. 9 illustrates a chart illustrating a computation of intra-ring traffic for rings, according to an example embodiment of the present invention.

FIG. 7 illustrates a method of performing block 330 in FIG. 3 (determining local rings) according to an example embodiment of the present invention. FIG. 7 shows blocks 700-745. This embodiment makes use of a ring set and a final set to assign the rings in the network. For discussion purposes, a maximum number of nodes per ring n is three in this example. Also, the example network 800 in FIG. 8 will be referenced. In network 800: nodes are at 1, 2, 3, 4, 5, 6, 7, and 8; links are at 12, 24, 14, 13, 35, 43, 45, 57, 46, 65, 68, and 87; while hubs are at nodes 4 and 5. Considering a preferred maximum number of nodes per ring as n=3, possible rings are at: A (124), B (143), C (345), and D (456). In addition, chart 900 in FIG. 9, showing an example computation of intra-ring traffic for rings A, B, C, D, and E, will be referenced.

Referring to FIG. 7, at block 700, the ring set and the final set are initialized to empty sets. At block 705, rings having a size n or smaller are assigned to a ring set. Applying this block to network 800 (shown in FIG. 8), the rings having a size n=3 or smaller are rings A, B, C, and D. These rings are assigned to the ring set.

At block 710, the ring set is checked to see if it includes all of the nodes in the network. If so, the next block is 720. Otherwise, the next block is 715. Currently, the ring set includes rings A, B, C, and D (or nodes 1, 2, 3, 4, 5, and 6), but does not include nodes 7 and 8. Because the ring set does not include all of the nodes in the network, the next block is 715. At block 715, 7 is increased by 1. Also at block 715, a ring that accesses at least one of the nodes not in the current ring set and has a size n is assigned to the ring set. Applying block 715, n is increased to four. Also, in network 800 (shown in FIG. 8), ring E accesses at least one of the nodes not in the ring set (node 7 or node 8) and has a size n=4. Accordingly, ring E is assigned to the ring set. The ring set now includes rings A, B, C, D, and E.

Blocks 710 and 715 are repeated until the ring set includes all of the nodes in the network. Currently, the ring set includes rings A, B, C, D, and E (or nodes 1, 2, 3, 4, 5, 6, 7, and 8), which are all of the nodes in the network. Accordingly, the next block is 720.

At block 720, the intra-ring traffic for all rings in the ring set is computed. This may be accomplished by summing the traffic between each node in a ring. The chart 900 (shown in FIG. 9) shows an example computation.

At block 725, the ring set is checked to see if it includes a ring that accesses a node that is accessed only by that particular ring. If there is a ring of this type, the next block is 730. Otherwise, the next block is 735. In network 800 (shown in FIG. 8), a ring of this type is ring A. Ring A accesses node 2 and node 2 is accessed by ring A and no other ring. Accordingly, the next block is 730.

At block 730, the ring that accesses a node that is accessed only by that ring is moved from the ring set to the final set. Ring A is moved from the ring set to the final set. The ring set now includes rings B, C, D, and E, and the final set now includes ring A.

Blocks 725 and 730 are repeated until there is no longer a ring in the ring set that accesses a node that is accessed only by that particular ring. For network 800 (shown in FIG. 8), blocks 725 and 730 are repeated for ring E. Ring E accesses node 8 that is accessed by ring E and no other ring. Ring E is moved from the ring set to the final set. The ring set now includes rings B, C and D and the final set now includes rings A and E.

At block 735, the final set is checked to see if it includes all of the nodes in the network. If so, the next block is 745. Otherwise, the next block is 740. Currently, the final set does not include all of the nodes in the network. The final set only includes rings A and E (or nodes 1, 2, 4, 5, 6, 7, and 8). Node 3 is not included in the final set. Accordingly, the next block is 740.

At block 740, a remaining ring that carries the largest intra-ring traffic among rings in the ring set that includes at least one node that is not yet included in the final set is moved from the ring set to the final set. According to the computations in chart 900 (shown in FIG. 9), a ring of this type is ring C. Ring C carries the largest intra-ring traffic (i.e., 1133 DS3) of all of the rings in the ring set (i.e., rings B, C, and D). Ring C is moved from the ring set to the final set. The ring set now includes rings B and D and the final set now includes rings A, C, and E.

Blocks 735 and 740 are repeated until the final set includes all of the nodes in the network. The final set now includes rings A, C, and E or nodes 1, 2, 3, 4, 5, 6, 7, and 8, which are all of the nodes in the network. Accordingly, the next block is 745.

At block 745, the rings in the final set are designated as the rings connecting the nodes in the network. Applying this block, rings A, C, and E are the rings to connect the nodes in the network.

FIG. 10 illustrates a method of performing block 420 in FIG. 4 (determining express and local rings) according to an example embodiment of the present invention. FIG. 10 blocks 1000-1055. This embodiment makes use of a ring set and a final set to assign the rings in the network. For discussion purposes, a maximum nodes per ring n is three and an example predetermined number of hubs accessed by a ring is two. Also, example network 800 (shown in FIG. 8) will be referenced. In network 800: nodes are at 1, 2, 3, 4, 5, 6, 7, and 8; links are at 12, 24, 14, 13, 35, 43, 45, 57, 46, 65, 68, and 87; hubs are at nodes 4 and 5; and with a preferred n=3, possible rings are at: A (124), B (143), C (345), and D (456). In addition, chart 900 (shown in FIG. 9), showing an example computation of intra-ring traffic for rings A, B, C, D, and E, and the hubs (if any) that each ring accesses, will be referenced.

At block 1000, the ring set and the final set are initialized to empty sets. At block 1005, rings having a size n or smaller are assigned to a ring set. Applying this block to network 800 (shown in FIG. 8), the rings having a size n=3 or smaller are rings A, B, C, and D. These rings are assigned to the ring set.

At block 1010, the ring set is checked to see if it includes all of the nodes in the network. If so, the next block is 1020. Otherwise, the next block is 1015. Currently, the ring set includes rings A, B, C and D (or nodes 1, 2, 3, 4, 5, and 6), but does not include nodes 7 and 8. Because the ring set does not include all of the nodes in the network, the next block is 1015. At block 1015, n is increased by 1. Also at block 1015, a ring that access at least one of the nodes not in the current ring set and has a size n is assigned to the ring set. Applying block 1015, n is increased to four. Also, in network 800 (shown in FIG. 8), ring E accesses at least one of the nodes not in the ring set (node 7 or node 8) and has a size n=4. Accordingly, ring E is assigned to the ring set. The ring set now includes rings A, B, C, D, and E.

Blocks 1010 and 1015 are repeated until the ring set includes all of the nodes in the network. Currently, the ring set includes rings A, B, C, D, and E (or nodes 1, 2, 3, 4, 5, 6, 7, and 8), which are all of the nodes in the network. Accordingly, the next block is 1020.

At block 1020, the intra-ring traffic for all rings in the ring set is computed. The chart 900 (shown in FIG. 9) shows an example computation.

At block 1025, the ring set is checked to see if it includes a ring that accesses a node that is accessed only by that particular ring. If there is a ring of this type, the next block is 1030. Otherwise, the next block is 1035. In network 800 (shown in FIG. 8), a ring of this type is ring A. Ring A accesses node 2 and node 2 is accessed by ring A and no other ring. Accordingly, the next block is 1030.

At block 1030, the ring that accesses a node that is accessed only by that ring is moved from the ring set to the final set. Ring A is moved from the ring set to the final set. The ring set now includes rings B, C, D, and E and the final set now includes ring A.

Blocks 1025 and 1030 are repeated until there is no longer a ring in the ring set accessing a node that is accessed only by that particular ring. For network 800 (shown in FIG. 8), blocks 1025 and 1030 are repeated for ring E. Ring E accesses node 8 that is accessed by ring E and no other ring. Ring E is moved from the ring set to the final set. The ring set now includes rings B, C, and D and the final set now includes rings A and E.

At block 1035, the final set is checked to see if it includes all of the nodes in the network and if there is a hub in ring set. If so, the next block is 1040. Otherwise, the next block is 1045. Currently, the final set does not include all of the nodes of the network. The final set only includes rings A and E (or nodes 1, 2, 4, 5, 6, 7, and 8). Node 3 is not included in the final set. Further, there is a hub in the ring set. The ring set (rings B, C, and D or nodes 1, 3, 4, 5, and 6) includes hubs at nodes 4 and 5. Accordingly, the next block 1040.

At block 1040, a remaining ring that carries the largest intra-ring traffic among rings in the ring set and accesses a predetermined number of hubs is moved from the ring set to the final set. For discussion purposes, the predetermined number of hubs accessed by a ring is two. According to chart 900 (shown in FIG. 9), a ring of this type of this type is ring C. Ring C carries the largest intra-ring traffic (i.e., 1133 DS3) of all of the rings in the ring set (rings B, C, and D) and accesses two hubs (nodes 4 and 5). Ring C is moved from the ring set to the final set. The ring set now includes rings B and D and the final set now includes rings A, C, and E.

Blocks 1035 and 1040 are repeated until the final set includes all of the nodes in the network or the ring set no longer includes a hub. The final set now includes rings A, C, and E or nodes 1, 2, 3, 4, 5, 6, 7, and 8, which are all of the nodes in the network. The next block is 1045.

At block 1045, the final set is checked to see if it includes all of the nodes in the network. If so, the next block is 1055. Otherwise, the next block is 1050, where a remaining ring that carries the largest intra-ring traffic among rings in the ring set and includes at least one node that is not already included in the final set is moved from the ring set to the final set. The final set now includes rings A, C, and E or nodes 1, 2, 3, 4, 5, 6, 7, and 8, which are all of the nodes in the network. Accordingly, the next block is 1055.

At block 1055, the rings in the final set are designated as the rings connecting the nodes in the network. Applying this block, rings A, C, and E are the rings to connect the nodes in the network.

Figure 11:
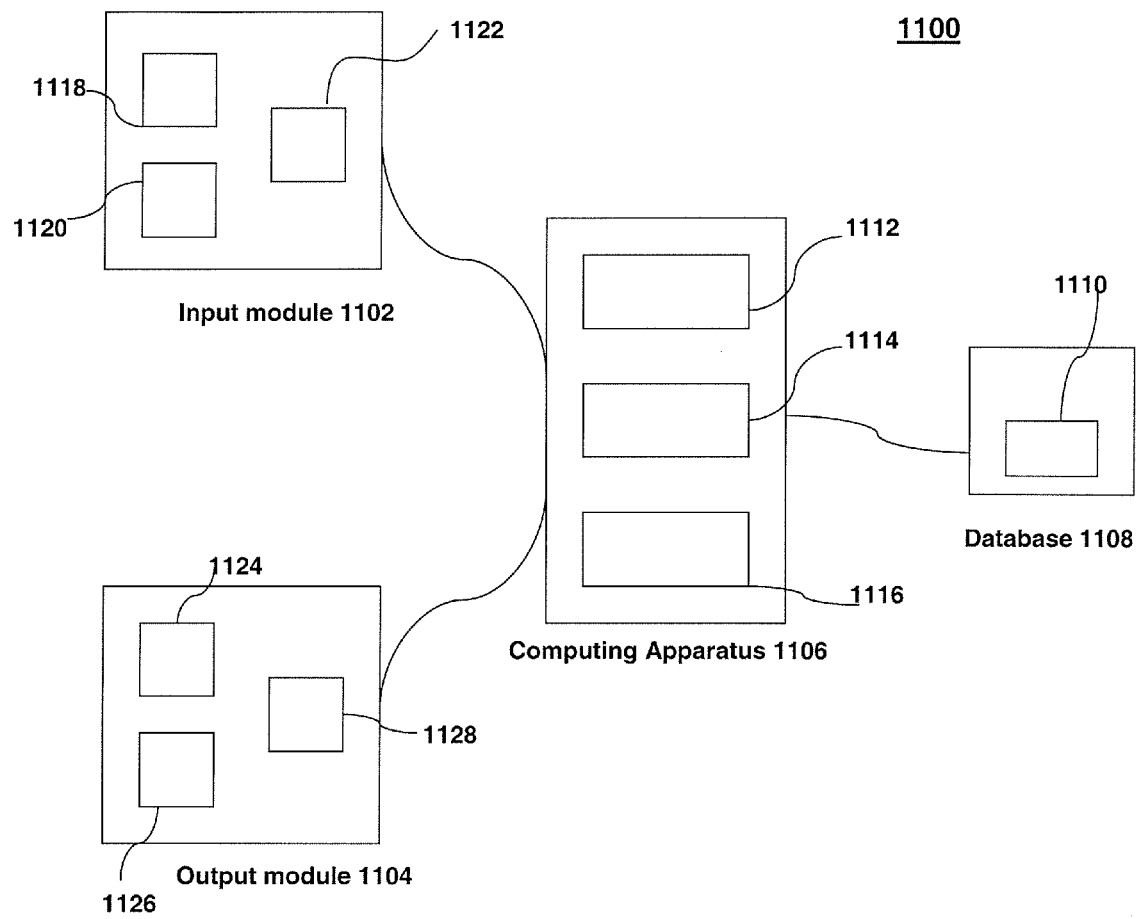
FIG. 11 illustrates a network planning system, according to an example embodiment of the present invention.

FIG. 11 illustrates a network planning system 1100, for planning a network having a plurality of nodes. System 1100 may include an input module 1102, an output module 1104, and a computing apparatus 1106. Computing apparatus 1106 may include or may be otherwise operatively coupled to a database 1108, which may be stored in a memory 1110. Database 1108 may include more than one database or other type of electronic repository. Computing apparatus 1106 may be adapted to include the necessary functionality and computing capabilities to implement network planning strategies through input module 1102 and access, read, and write to database 1108. The results of received data may be provided as output from computing apparatus 1106 to output module 1104 for printed display, viewing, and/or further communication to other network devices. Such output may include, for example, information packages, results, topology, or other network information obtained from the planning system for the user's reference. Output from computing apparatus 1106 can also be provided to database 1108, which may be utilized as a storage device for network planning information for users, customers or employees.

In the example embodiment of FIG. 11, computing apparatus 1106 may include a personal (PC) or mainframe computer configured to perform various functions and operations. Computing apparatus 1106 may be implemented, for example, by a general purpose computer selectively activated or reconfigured by a computer program stored in the computer, or may be a specially constructed computing apparatus adapted to carry out the features and operations of network planning system 1100. Computing apparatus 1106 may also be implemented or provided with a wide variety of components or subsystems including, for example, one or more of the following: a processor 1112, a co-processor 1114, a register 1116, and/or other data processing devices and subsystems. Computing apparatus 1106 may also communicate or transfer network planning strategies and user feedback to and/or from input module 1102 and output module 1104 through the use of direct connections or other communication links, as illustrated in FIG. 11. In an example embodiment, a firewall may prevent access to the apparatus by unauthorized outside entities. It is further contemplated that computing apparatus 1106 may require user authentication, such as password verification, in order to prevent unauthorized users from gaining access to network information associated with a particular provider or user.

It is further contemplated that communication between computing apparatus 1106, input module 1102, and output module 1104 can be achieved through the use of a network architecture (not shown). In such an embodiment, the network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components and systems. By using dedicated communication links or a shared network architecture, computing apparatus 1106 may be located in the same location or at a geographically distant location from input module 1102 and/or output module 1104.

Input module 1102 may include a wide variety of devices to receive and/or provide the data as input to computing apparatus 1106. As illustrated in FIG. 11, input module 1102 may include an input device 1118, a storage device 1120, and/or a network interface 1122. Input device 1118 may include a keyboard, mouse, touch screen, disk drive, video camera, magnetic card reader, or any other suitable input device for providing customer or user data to computing apparatus 1106. Memory 1120 may be implemented with various forms of memory or storage devices, such as read-only memory (ROM) devices and random access memory (RAM) devices. Memory 1120 may further include a tape or disk drive for reading and providing data on a storage tape or disk as input to computing apparatus 1106. Network interface 1122 may be configured to receive data over a network (such as a LAN, WAN, intranet or the Internet) and to provide the same as input to computing apparatus 1106. For example, network interface 1122 may be connected to a public or private database over a network for the purpose of receiving information about users, providers, or customers, from computing apparatus 1106.

Output module 1104 may include a display 1124, a printer device 1126, and/or a network interface 1128 for receiving the results provided as output from computing apparatus 1106. As indicated above, the output from computing apparatus 1106 may include one or more information packages or network information obtained from the network planning system for reference or further action. The output from computing apparatus 1106 may be displayed or viewed through display 1124 (such as a CRT or LCD) and printer device 1126. Network interface 1128 may also be configured to facilitate the communication of the output from computing apparatus 1106 over a network (such as a LAN, WAN, intranet or the Internet) to remote or distant locations for implementation, further analysis, viewing or storing.

Figure 12:
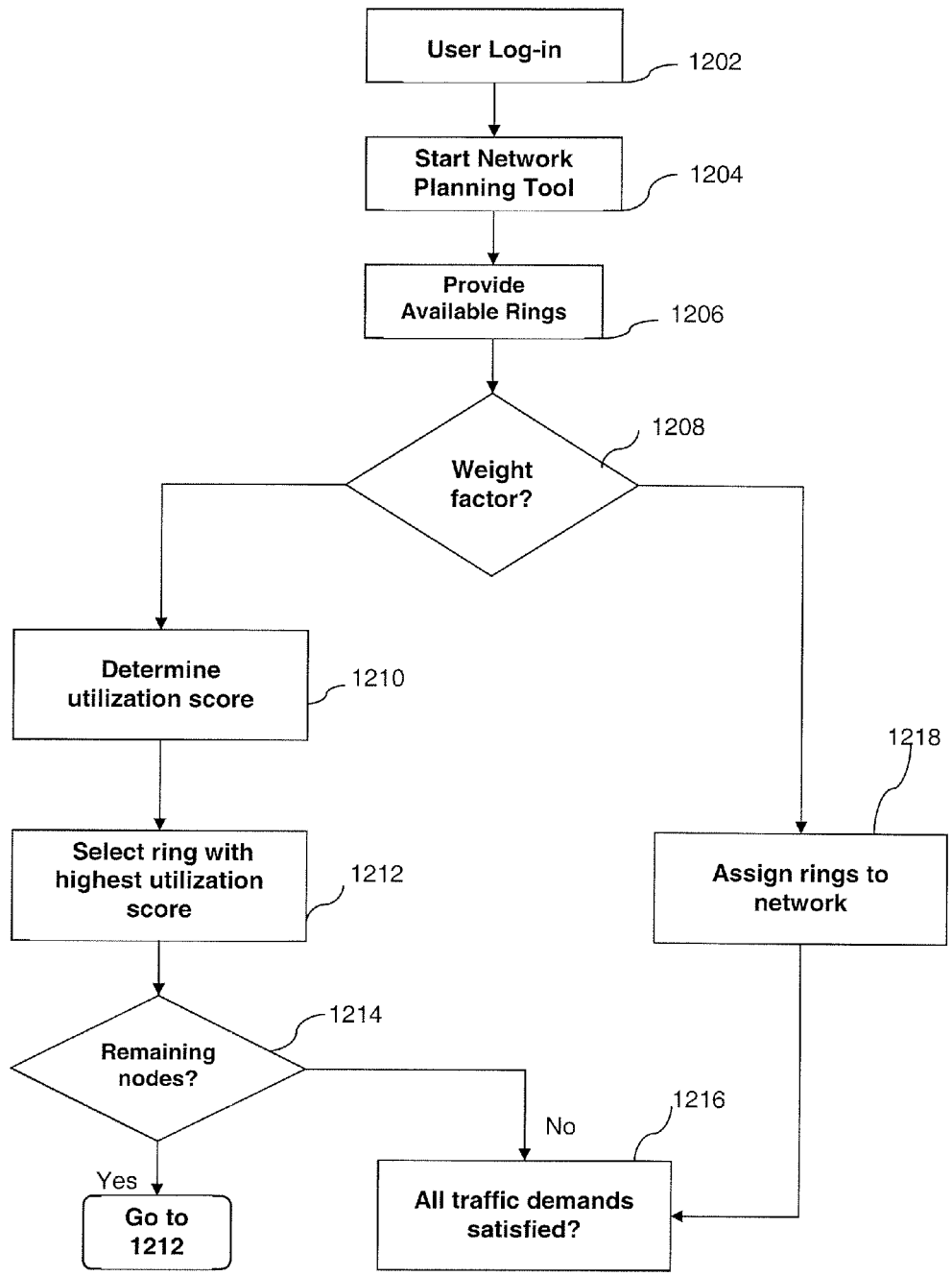
FIG. 12 illustrates a flow diagram for assigning rings, according to an example embodiment of the present invention.

FIG. 12 illustrates an example method that utilizes a network planning system 1110 to provide a network planning tool to a user. The method depicted in FIG. 12 will be described in more detail below.

The disclosed method and system may provide a network planning tool for customers, providers, or users. In particular, the disclosed method and system may be used to implement an interactive network planning tool based on a user's particular network planning needs or preferences. In this manner, a user who desires to plan or model a network structure, may visualize the configuration of the contemplated network while taking into consideration factors and constraints that may be particular to the user. The user of the network planning tool may then make an informed decision when selecting, building, altering or expanding a network's structure.

As illustrated in FIG. 12, in block 1202 a user follows a log-in procedure to log in to the network planning system. The log-in procedure may be completed via input module 1102, including input device 1118. During log-in, a user may also enter information related to particular network planning aspects, such as, for example, number of nodes in the network, number of nodes (n) to use in a ring, amount of traffic in a ring, node or network, network components and their respective cost, length of the network links, and circumference of each possible ring in the network. Other information may be entered depending on the particular network characteristics important for a particular network application. Of course, a planning tool may be provided where log-in is not required. Also, information regarding network nodes, network links and characteristics and parameters thereof may be loaded or retrieved from various memory devices. The user can also select which parameters should be used as selection criteria. Alternatively, the selection criteria can be hardwired or pre-set in the system.

Upon receipt and verification of log-in information, a network planning tool is initialized in block 1204. The network planning tool may be tailored to the particular user according to the information provided as part of the log-in procedure. The user is then presented with multiple flow paths or rings selectable by the user in block 1206. In block 1208, the user is given the alternative to select and assign a particular weight factor to the selection criteria being used, such as a maximum number of number of nodes per ring, amount of traffic in a ring, cost of network components, and ring circumference of each possible ring in the network.

If the user chooses to assign a weight factor to selection criteria contained within the tool, the network planning tool then provides information relating to a utilization score calculated for each possible ring in block 1210. For example, a user may have indicated in block 1202 that the most relevant factors to be considered in selecting the network rings for a particular project are the amount of traffic per ring and the ring circumference. If the user desires to assign equal weight to the amount of traffic per ring and ring circumference, the network planning tool may provide a utilization score including calculations for allocating equal weight (i.e., 50%) to both factors. The network planning tool may then calculate a utilization factor for each possible ring, giving equal consideration to the amount of traffic in the respective ring and the particular ring's circumference.

After utilization scores are calculated, the user is provided with possible network rings in the form of a list, including the possible ring with the highest utilization score at the top. Thus, the list of possible network rings, organized according to the determined utilization score, may include possible rings listed in an order different than in the case of, for example, a list prepared while considering only the amount of traffic in each possible ring.

For example, traffic may be specified in DS3 Accesses Equivalents for rings, as shown in FIG. 9, and size may be indicated in miles. Both parameters may take values having a magnitude of hundreds or thousands (e.g., 800 accesses or 200 miles). Hence, no scaling is required since the magnitudes are comparable. On the other hand, if a parameter is expressed in units having a typical magnitude in the tens (e.g., 25), the parameter may be multiplied by a scaling factor (e.g., 100) to give it a comparable magnitude.

Regardless of whether a scaling factor is used, a weight factor may be used to calculate a utilization score. For example, the traffic may be multiplied by a factor of 2 to give it twice the weight of the physical size of a ring. Thus, if a ring has traffic of 600 and a size of 200, the utilization score would be 2×600+200=1400. Of course, it may be the case that some selection criteria should have higher values while other election criteria should more desirably have smaller values (e.g., cost of ring components.). In this case, the scaled and/or weighted selection criteria could be subtracted rather than added. For example, if the cost of the ring components for the above example is $10,000 and that is scaled by dividing by 100, the utilization score would be calculated as 2×600+200−(10,000/100)=1300.

As part of the selected weight factors, the user may then be provided with a graphic representation of the proposed network. For example, the network planning tool may provide the user with a sample cost scenario, while also projecting how the network traffic demands may be satisfied by the determined ring structure for the planned network.

In addition to the presentation relating to the particular factor allocation made by the user, the network planning tool then selects a possible ring with the highest utilization score in block 1212. The results of the utilization score calculation are recorded by the network planning tool in a matrix in this example embodiment. The utilization score for each possible ring could be displayed as feedback for the user's input of desired selection criteria. Thus, the user can alter the selection criteria or the weight factors to interactively adjust the ring selection.

Having completed the calculation of the utilization score in block 1214, the network planning tool then determines whether there are any remaining nodes among the plurality of nodes that are not included among the possible ring selected in block 1212. If the tool determines that there are nodes not included in the selected ring, the network planning tool may then select the next possible ring with the highest utilization score (i.e., revert to block 1210). In doing so, the traffic demands and utilization scores may be recalculated before determining the ring with the next highest score. If no additional network nodes are left, the tool may evaluate whether all the network traffic demands are satisfied in block 1216. If all the network traffic demands are satisfied, the network planning tool ends the selection of rings. The possible rings selected up to this point are then the final rings, chosen for building the planned network. This final group of selected rings may then represent the allocation of selection criteria, as determined by the user's preferences and constraints.

If the user instead decides not to select a particular weight factor for each selection criteria in block 1208, the network planning tool may assign a weight factor for each criteria automatically or provide network planning strategies in a predetermined sequential manner, considering, for example, a single selection criteria (block 1218). As such, the user may not desire to allocate any particular weight to more than one factor, which may be considered the most important. Thus may be the case in which the network planner is required to limit the possible network rings to a single maximum number of nodes, or in case the planner desires to select the network rings solely on the basis of the amount of traffic demands for each particular ring. Again, the planning tool may automatically assign weight factors to selection criteria. For example, depending on the value n of nodes in a ring, the cost or physical size may be automatically assigned a greater weight. Having completed selection of the possible rings, considering only a single factor, the planning routine may end after a determination that all network traffic demands are satisfied (block 1216).

As described in this example embodiment, the utilization score is used to select rings until all nodes and traffic demands are accounted for. Alternatively, the final set of rings could first include rings that include a node that is not included in any other ring, and then the utilization score is used to select remaining rings to include nodes not yet included in the final set. In other words, the previous example embodiment may be modified to use multiple selection criteria and, if desired, weight factors.

Further, although this example embodiment has been described as a network planning tool that incorporates user input, the method could be applied automatically by a processing device provided with all the relevant node and network information. Thus, a network node could redetermine rings and distribute configuration information in the event of a necessary change (e.g., catastrophic failure of some links).

The method disclosed can determine the network rings that each traffic demand traverses by considering the weight of predetermined criteria. Therefore, the present disclosure can provide several advantages to a service provider or network planner, such as for example: effective use of bandwidth because more traffic can be put on a given ring; reduction of equipment, such as dual homing equipment that typically resides at inter-ring connections, due to fewer inter-ring connections; reduction in component cost; and reduction of optical fiber due to fewer or smaller rings.

Although this invention has been described in certain specific example embodiments, many additional modifications and variations would be apparent to those skilled in the art. It is therefore to be understood that this invention may be practiced otherwise than as specifically described. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention. Components described as software executing on a processor can be implemented as hardware circuits or a combination of hardware and software. Thus, the present embodiments of the invention should be considered in all respects as illustrative and not restrictive, the scope of the invention to be determined by any claims supportable by this application and the claims' equivalents rather than the foregoing description.

Software embodiments of the present invention may be provided as a computer program product, firmware, or software, that may include an article of manufacture on a machine accessible or machine readable medium (memory) having instructions. The instructions on the machine accessible or machine readable medium may be used to program a computer system or other device. The machine-readable medium may include, but is not limited to, floppy diskettes, optical disks, flash drives, CD-ROMs, and magneto-optical disks or other types of media/machine-readable medium suitable for storing electronic instructions. The techniques described herein are not limited to any particular software configuration. They may find applicability in any computing or processing environment. The terms "machine accessible medium," "computer readable medium" or "machine readable medium" include any medium that is capable of storing, encoding, or embodying a sequence of program code or instructions for execution by the machine and that cause the machine to perform any one of the methods described herein. Furthermore, it is common in the art to speak of software, in one form or another (e.g., program, procedure, process, application, module, unit, logic, code, and so on) as taking an action or causing a result. Such expressions are merely a shorthand way of stating that the execution of the software by a processing device causes the processor to perform an action in order to produce a result. In other embodiments, functions performed by software can instead be performed by hard-coded modules. Therefore, the invention is not limited only for use with stored software programs.

In addition, it should be understood that the figures illustrated in the drawing sheets, which highlight example functional aspects and uses of the present invention, are presented for example purposes only. The architectural aspects of the present invention are sufficiently flexible and configurable, such that it may be utilized (and navigated) in ways other than that shown in the accompanying figures.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the procedures recited in the claims need not be performed in the order presented.

I claim:

1. A method for planning a network having a plurality of nodes, comprising:
   determining all rings in the network satisfying a predetermined condition;
   calculating a utilization score for each of the determined rings satisfying the predetermined condition based on a combination of predetermined selection criteria, the calculating being performed by multiplying each of a plurality of weight factors by a magnitude of the predetermined selection criteria and summing resultant weighted values for all the selection criteria;
   selecting a first ring among the determined rings satisfying the predetermined condition, the first ring having the highest utilization score among the utilization scores calculated for the determined rings satisfying the predetermined condition;
   determining whether there are remaining nodes among the plurality of nodes that are not included in the first ring; and
   selecting a second ring among the determined rings satisfying the predetermined condition if it is determined there are remaining nodes,
   wherein the determination of all rings satisfying the predetermined condition and the determination of whether there are remaining nodes are performed on a network planning system that includes at least one computer.

2. A method according to claim 1, wherein the predetermined selection criteria include at least two of: amount of traffic in a ring, cost of ring components, ring circumference, and number of nodes per ring.

3. A method according to claim 2, further comprising creating a matrix containing traffic demands, wherein the calculating uses the matrix.

4. A method according to claim 3, further comprising updating the traffic demands in the matrix by removing demands satisfied by the first ring.

5. A method according to claim 4, further comprising successively selecting unselected rings among the determined rings satisfying the predetermined condition until all the traffic demands in the matrix are satisfied.

6. A method according to claim 2, wherein the calculating further comprises allocating the weight factors to respective predetermined selection criteria.

7. A method according to claim 6, wherein the weight factors are allocated according to a criticality of each of the predetermined selection criteria.

8. A method according to claim 6, wherein the weight factors are allocated automatically.

9. A method according to claim 6, wherein the weight factors are allocated by a user.

10. An apparatus adapted to plan a network having a plurality of nodes, comprising:
    at least one memory device to store information about the nodes; and
    a processor adapted to
    (i) determine all rings in the network satisfying a predetermined condition,
    (ii) calculate a utilization score for each of the determined rings satisfying the predetermined condition based on a combination of predetermined selection criteria, by multiplying each of a plurality of weight factors by a magnitude of the predetermined selection criteria and summing resultant weighted values for all the selection criteria,
    (iii) select a first ring among the determined rings satisfying the predetermined condition, the first ring having the highest utilization score among the utilization scores calculated for the determined rings satisfying the predetermined condition,
    (iv) determine whether there are remaining nodes among the plurality of nodes that are not included in the first ring, and
    (v) select a second ring among the rings satisfying the predetermined condition if it is determined there are remaining nodes.

11. A network planning apparatus according to claim 10, wherein the predetermined selection criteria include at least two of: amount of traffic in a ring, cost of ring components, ring circumference, and number of nodes per ring.

12. A network planning apparatus according to claim 11, wherein the processor is further adapted to allocate the weight factors to respective predetermined selection criteria, according to a criticality of each of the predetermined selection criteria.

13. A network planning apparatus according to claim 11, wherein the processor is further adapted to create a matrix containing traffic demands, and update the traffic demands by removing demands satisfied by the first ring.

14. A network planning apparatus according to claim 12, wherein the weight factors are allocated by a user.

15. A network planning apparatus according to claim 13, wherein the processor is adapted to successively select unselected rings among the determined rings satisfying the predetermined condition until all the traffic demands in the matrix are satisfied.

16. A method for planning a network having a plurality of nodes, comprising:
    determining all rings in the network satisfying a predetermined condition;
    selecting a first ring among the determined rings satisfying the predetermined condition based on predetermined selection criteria;
    determining whether there are remaining nodes among the plurality of nodes that are not included in the selected ring; and
    selecting a second ring among the determined rings satisfying the predetermined condition if it is determined there are remaining nodes,
    wherein the determination of all rings satisfying the predetermined condition and the determination of whether there are remaining nodes are performed on a network planning system that includes at least one computer, and at least one of the selectings includes multiplying each of a plurality of weight factors by a magnitude of the predetermined selection criteria and summing resultant weighted values for all the selection criteria.

17. A method according to claim 16, wherein the predetermined selection criteria is amount of traffic in a ring.

18. A method according to claim 16, further comprising creating a matrix containing network conditions, wherein the selecting uses the matrix.

19. A method according to claim 18, further comprising successively selecting unselected rings among the determined rings satisfying the predetermined condition until all the network conditions in the matrix are satisfied.

20. A method according to claim 16, wherein the at least one of the selectings further comprises allocating the weight values to respective predetermined selection criteria.

\* \* \* \* \*